US008885060B2

(12) United States Patent
Mochizuki (10) Patent No.: US 8,885,060 B2
(45) Date of Patent: Nov. 11, 2014

(54) RECORDING APPARATUS FOR AT LEAST RECORDING MOVIE DATA AND STILL IMAGE DATA SO AS TO BE ASSOCIATED WITH EACH OTHER

(75) Inventor: Shigeki Mochizuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 654 days.

(21) Appl. No.: 12/258,191

(22) Filed: Oct. 24, 2008

(65) Prior Publication Data
US 2009/0115861 A1 May 7, 2009

(30) Foreign Application Priority Data

Nov. 7, 2007 (JP) ................................. 2007-289258

(51) Int. Cl.
*H04N 5/225* (2006.01)
*H04N 5/76* (2006.01)
*H04N 9/804* (2006.01)
*H04N 5/77* (2006.01)
*H04N 5/781* (2006.01)

(52) U.S. Cl.
CPC ............... *H04N 9/8042* (2013.01); *H04N 5/77* (2013.01); *H04N 5/781* (2013.01)
USPC .................................... 348/220.1; 348/231.2

(58) Field of Classification Search
USPC ........... 348/220.1, 372, 333.05, 231.2, 222.1, 348/231.99, 231.5
See application file for complete search history.

(56) References Cited

U.S. PATENT DOCUMENTS

| 5,966,122 A * | 10/1999 | Itoh .............................. 715/838 |
| 6,243,531 B1 * | 6/2001 | Takeuchi et al. .............. 386/224 |
| 8,004,594 B2 * | 8/2011 | Oyama et al. ............ 348/333.05 |
| 2003/0123859 A1 * | 7/2003 | Ikeda ............................. 386/120 |
| 2005/0057667 A1 * | 3/2005 | Shimizu et al. .......... 348/231.99 |

FOREIGN PATENT DOCUMENTS

| CN | 1656795 A | 8/2005 |
| CN | 1314045 A | 9/2011 |
| JP | 2000-134563 A | 5/2000 |
| JP | 2002-300445 A | 10/2002 |
| JP | 2004-080354 A | 3/2004 |
| JP | 2006-180101 A | 7/2006 |
| JP | 2007-124667 A | 5/2007 |
| JP | 2007-325152 A | 12/2007 |

* cited by examiner

*Primary Examiner* — Ahmed A Berhan
(74) *Attorney, Agent, or Firm* — Canon USA, Inc., IP Division (57) ABSTRACT

Still image data generated in response to an instruction for starting the recording of movie data is recorded in such a manner as to be associated with the movie data, and information indicating that the still image data associated with the movie data has been recorded is displayed in response to an instruction for predetermined processing on the movie data.

13 Claims, 8 Drawing Sheets

RECORDING APPARATUS FOR AT LEAST RECORDING MOVIE DATA AND STILL IMAGE DATA SO AS TO BE ASSOCIATED WITH EACH OTHER

BACKGROUND OF THE INVENTION

1. Field of the Invention

The present invention relates to a recording apparatus.

2. Description of the Related Art

Recording apparatuses, such as video cameras and still cameras, which are capable of recording movies and still images, have been known. Some types of these recording apparatuses have, for example, a mode switch, so that a movie recording mode and a still image shooting mode can be switched.

In such video cameras, for example, even when a user intends to capture a still image, there are cases in which a shutter button is operated with a mode switch being set on the movie recording side, causing an image to be failed to be obtained in still image shooting.

SUMMARY OF THE INVENTION

The present invention provides a recording apparatus which, even if movie recording was performed with an incorrect operation, is capable of obtaining a still image when movie recording was performed with an operation to be performed later.

An image pickup apparatus according to the present invention includes an image pickup device configured to convert an optical image of an object into an image signal; a first generation circuit configured to generate movie data from the image signal; a second generation circuit configured to generate still image data from the image signal; a recording circuit configured to record the movie data and the still image data on a recording medium; an instruction circuit configured to instruct the starting of recording of the movie data; a controller configured to control, in response to an instruction from the processing instruction circuit, the second generation circuit so as to generate still image data from the movie data, and configured to control the recording circuit so as to record the movie data and the still image data in such a manner as to be associated with each other; a display circuit configured to display information indicating the movie data and the still image data on a display unit; and a processing instruction circuit configured to instruct a predetermined process on the movie data. The controller controls, in response to an instruction from the processing instruction circuit, the display circuit so as to display information indicating that still image data associated with the movie data has been recorded in a case where the still image data associated with the movie data has been recorded.

According to the present invention, for example, even when movie recording is performed, it is possible to obtain a still image when movie recording was performed with an operation to be performed later.

Other features, aspects and advantages besides those discussed above shall be apparent to those skilled in the art from the description of the embodiments of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

First Embodiment

A description will be given below of an image pickup apparatus capable of capturing a movie and a still image and recording them as movie data and still image data.

Figure 1:
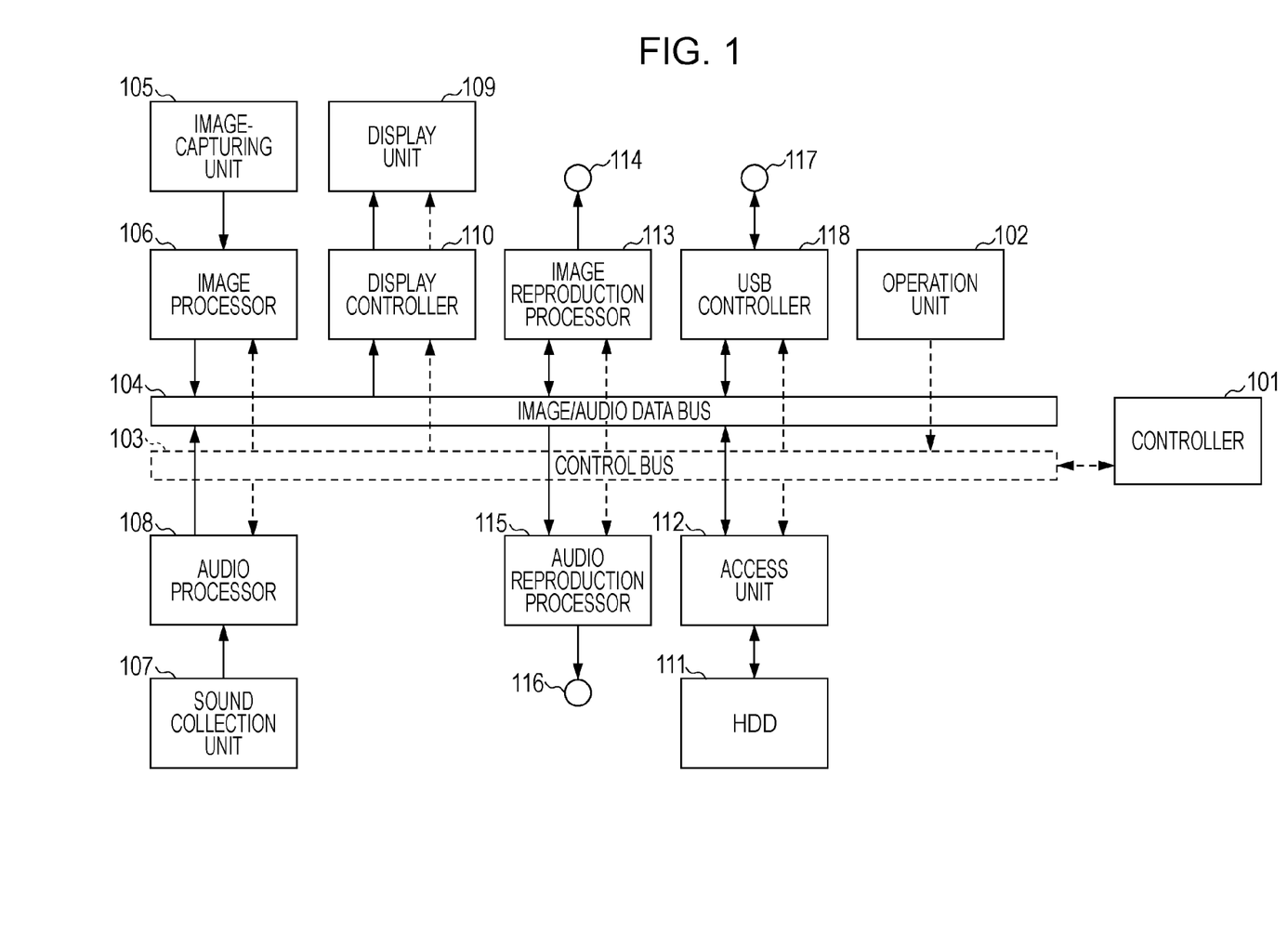
FIG. 1 is a block diagram showing a video camera according to a first embodiment of the present invention.

FIG. 1 is a block diagram of a video camera according to the present embodiment.

Referring to FIG. 1, reference numeral 101 denotes a controller for controlling individual blocks in accordance with various kinds of functions of the video camera. Reference numeral 102 denotes an operation unit for inputting instructions from the outside to the video camera. The operation unit 102 is formed of a power-supply switch, a selection switch for selecting a movie recording mode, a shutter button for instructing starting/completion of image-capturing, and others. Reference numeral 103 denotes a control signal bus through which a control signal from the controller 101, an instruction signal from the operation unit 102, and the like are transferred. Reference numeral 104 denotes an image/audio data bus through which image data and audio data are transferred among the blocks.

Reference numeral 105 denotes an image-capturing unit which is formed of an imaging lens for receiving an optical image of an object, an aperture stop for controlling light quantity, an image-capturing unit for converting the optical image into an electrical signal, and which receives an image signal. Reference numeral 106 denotes an image processor for correcting an image signal input from the image-capturing unit 105 to an appropriate signal level, converting it into digital data, and performing processing necessary for an image recording method. The image processor 106 is able to generate movie data and still image data.

Reference numeral 107 denotes a sound collection unit formed of a microphone for receiving sound, an amplifier for amplifying the received audio signal into an appropriate level.

Reference numeral 108 denotes an audio processor for converting the audio signal obtained from the sound collection unit 107 into digital data and for performing processing necessary for an audio recording method.

Reference numeral 109 denotes a display unit for, during recording, displaying video data obtained from the image processor 106 and for, during reproduction, displaying an image reproduced by an image reproduction processor 113 (to be described later), and also for displaying various kinds of menus. The display unit may be an external display device. Reference numeral 110 denotes a display controller for controlling the display of the display unit 109.

Reference numeral 111 denotes a hard disk (hereinafter referred to as an "HDD") as a recording medium for recording movie data and still image data obtained from the image processor 106, audio data obtained from the audio processor 108, and other data in such a manner as to be associated with one another as necessary. Reference numeral 112 denotes an access unit for accessing the HDD 111 so as to read and write the above-described movie data, still image data, audio data, and the like.

Reference numeral 113 denotes an image reproduction processor for processing movie data of the HDD 111, which is read by the access unit 112, in accordance with an image recording method and converting the movie data into a predetermined format. Furthermore, the image reproduction processor 113 is able to process still image data of the HDD 111, which is read by the access unit 112, in accordance with an image recording method, and to convert the still image data into a predetermined format. Reference numeral 114 denotes a video terminal through which an image signal reproduced by the image reproduction processor 113 is output to the outside.

Reference numeral 115 denotes an audio reproduction processor for reproducing audio data of the HDD 111, which is read by the access unit 112, in accordance with an audio recording method. Reference numeral 116 denotes an audio terminal through which an audio signal reproduced by the audio reproduction processor 115 is output to the outside.

Reference numeral 117 denotes a USB terminal through which communication is performed with an external device, such as a PC, and transmission and reception of movie data, still image data, audio data, and the like, which are recorded in the HDD 111, is performed with the external device. Reference numeral 118 denotes a USB controller for controlling the transmission and reception of data with external devices connected to the USB terminal 117.

In the present embodiment, the HDD 111 is used as a storage medium. This storage medium is not limited to a hard disk, and a magnetic (or magneto-optical) recording medium may be used.

As an external connection terminal, the USB terminal 117 is used. The external connection terminal is not limited to a USB terminal, and a terminal, such as an IEEE 1394 terminal, through which digital data can be input and output, may be used.

First, a selection of the mode of the video camera according to the present embodiment will be described.

When the power-supply switch of the operation unit 102 is operated by the user and the power-supply switch of the video camera is switched on, first, the controller 101 confirms the selection switch of the operation unit 102 in order to determine whether the still image recording mode has been selected or the movie recording mode has been selected. At this point, for setting the recording mode selected using the selection switch of the operation unit 102, the controller 101 sets each block of the video camera.

Next, a description will be given of a recording operation for when a movie recording mode is selected using the selection switch of the operation unit 102.

When the movie recording mode is selected, the video camera enters an image-capturing waiting state. In this state, by operating the shutter button of the operation unit 102 by the user, an instruction for starting movie recording is made to the video camera. In response to this instruction for starting the movie recording, the controller 101 transmits a signal of an instruction for starting image capturing to the image capturing unit 105, the image processor 106, and the like.

When image capturing starts, the quantity of light from an object, which enters through the imaging lens of the image-capturing unit 105, is controlled by an aperture stop, and is converted into an electrical signal by an image pickup device. The electrical signal is adjusted to an appropriate signal level by the image processor 106 and is converted into digital data. Then, image data that is converted into digital data is adjusted to an appropriate number of pixels by a number-of-pixels adjustment circuit of the image processor 106, or the like, is compressed and coded in accordance with a predetermined image recording method, and is formed as movie data.

Furthermore, an audio signal collected by the sound collection unit 107 is amplified by an amplifier of the audio processor 108 and is converted into digital data.

The controller 101 combines the movie data and the audio data in order to form a data stream and outputs it to the access unit 112. In accordance with the instructions of the controller 101, the access unit 112 starts to write the data stream of movie data and audio data as one movie file in the HDD 111 under the file system management, such as UDF, FAT, and the like. The file system means a structural system formed of management information used to manage files and file data. By using this file system in common, recording and reproduction can be performed among different storage media or among different recording/reproduction devices.

The data stream is sent to the video terminal 114 as necessary or is displayed on the display unit 109 via the display controller 110.

In response to an instruction for completing movie recording being made to the video camera as a result of operating again the shutter button of the operation unit 102 by the user, the controller 101 transmits a signal of instructing the completion of the image capturing to the image-capturing unit 105, the image processor 106, and the like.

In response to the signal of instructing the completion of the movie recording being received, the image-capturing unit 105 and the image processor 106 completes the image-capturing operation. Under the instructions of the controller 101, the access unit 112 combines, as one file, a series of movie data and audio data, which are recorded from when image capturing is started until the image capturing is completed, writes this entire file in the HDD 111, and completes the recording operation. The controller 101 allows the video camera to shift to an image-capturing waiting state.

Next, a description will be given of a recording operation for when a still image recording mode is selected using the selection switch of the operation unit 102.

When the still image recording mode is selected, the video camera enters an image-capturing waiting state. In this status, by operating the shutter button of the operation unit 102 by the user, an instruction for starting image capturing is made to the video camera. In response to this instruction for starting image capturing, the controller 101 transmits a signal of instructing the starting of image capturing for capturing one still image to the image-capturing unit 105, the image processor 106, and the like.

When image capturing starts, the quantity of light from an object, which enters through the imaging lens of the image-capturing unit 105, is controlled using an aperture stop and is converted into an electrical signal using an image pickup device. The electrical signal is adjusted to an appropriate signal level by the image processor 106, is converted into digital data, is compressed in accordance with a predetermined still image recording method, and is formed as still image data. In accordance with the instructions of the controller 101, the access unit 112 writes, as one still image file, the still image data, which is obtained as a result of the one operation of the shutter button, in the HDD 111 under the file system management, such as UDF or FAT. Thereafter, the controller 101 sets the status of the video camera to the image-capturing waiting state again.

Next, a description will be given of a normal reproduction operation of the image pickup apparatus of the present embodiment. At this time, a reproduction mode is selected using the selection switch of the operation unit 102.

In response to the reproduction mode being specified using the selection switch of the operation unit 102, the controller 101 controls the access unit 112 in such a manner that movie data and still image data are read from the HDD 111. Then, the controller 101 controls the display controller 110 so that a thumbnail screen on which thumbnails of the read movie data and still image data are arranged, and file names of the movie data and the still image data are displayed on the display unit 109. Furthermore, the controller 101 may control the display controller 110 so that the last captured movie data, still image data, or the like are displayed on the display unit 109.

In a state in which the thumbnail screen has been displayed, when the user operates the operation unit 102 in order to instruct that movie data and still image data be reproduced, the controller 101 controls each block so that each item of image data is reproduced.

When still image data is to be reproduced, in response to the instruction from the operation unit 102, the controller 101 allows the image reproduction processor 113 to expand the amount of decoded information of the still image data read from the HDD 111. The expanded still image data is displayed as one still image on the display unit 109 by the display controller 110. The still image data may be output from the video terminal 114.

When movie data is to be reproduced, in response to the instruction from the operation unit 102, the controller 101 separates content data read from the HDD 111 to audio data and movie data. The amount of decoded information of the movie data is expanded by the image reproduction processor 113 and is displayed as an image on the display unit 109 by the display controller 110. The movie data may be output from the video terminal 114. The audio data is transmitted to the audio reproduction processor 115, and the amount of decoded information is expanded and is output from the audio output terminal 116.

Figure 2:
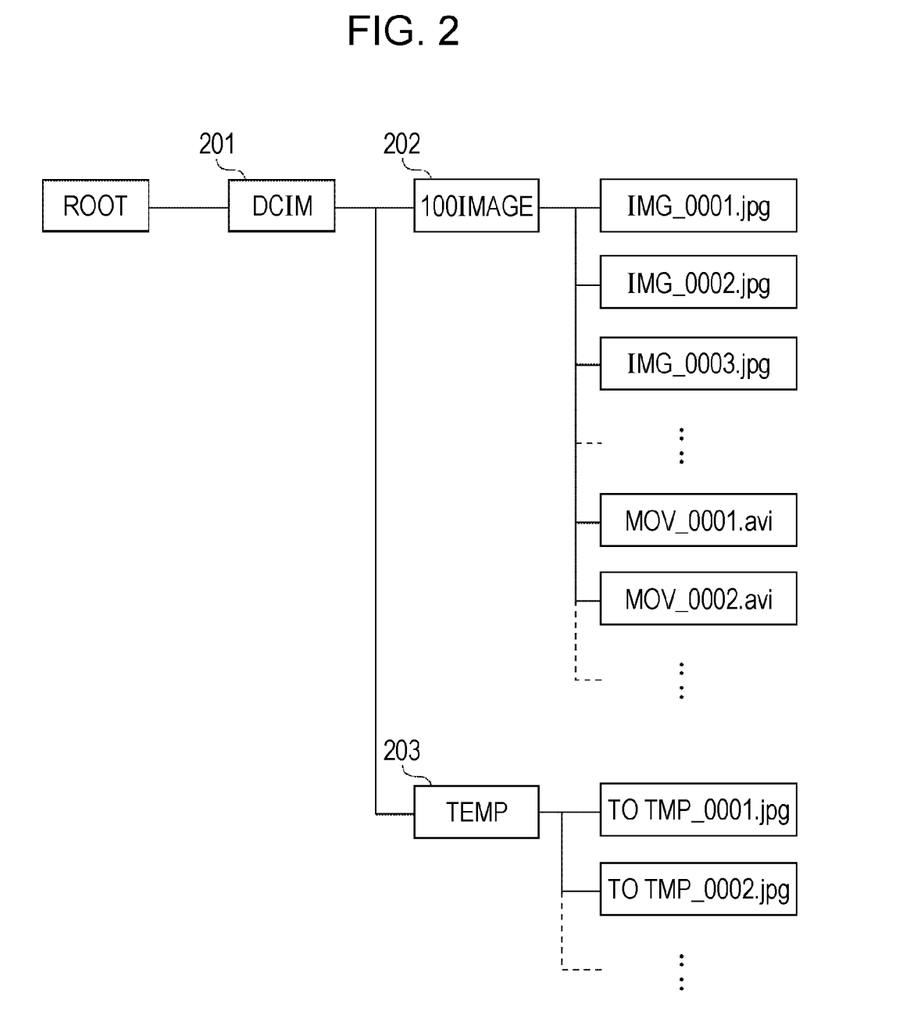
FIG. 2 shows a directory structure inside a hard disk according to the first embodiment of the present invention.

Here, a description will be given of a directory structure in which movie data, still image data, and the like are recorded in the HDD 111 of the video camera of the present embodiment.

The HDD 111 stores captured still image data/movie data in a DCIM directory 201, which is a top directory, as shown in FIG. 2. In the DCIM directory 201, a "100IMAGE" directory (hereinafter will be referred to as an IMG directory 202) is stored. As will be described later, in the DCIM directory 201, a "TEMP" directory (hereinafter referred to as a TMP directory 203) in which still image data captured together with movie data is stored at movie recording start time and at movie recording completion time.

The relationship between the recording mode of the video camera of the present embodiment and the above-described directory will be described. The still image data obtained by operating the shutter button when the still image recording mode has been selected is recorded in the IMG directory 202. The movie data obtained by operating the shutter button when the movie recording mode has been selected is recorded in the IMG directory 202. As will be described later, the still image data captured together with the movie data at movie recording start time and at movie recording completion time is recorded in the TMP directory 203. That is, when still image data is to be recorded, the controller 101 determines whether or not which one of the still image recording mode and the movie recording mode has been selected, and controls the access unit 112 in such a manner that a different directory for recording is used according to the selected recording mode.

In the reproduction mode, files within the TMP directory 203 are not displayed unless a predetermined operation is performed unlike the operation for instructing the above-described normal reproduction. More specifically, when the reproduction mode is selected, the controller 101 displays a thumbnail screen of files stored in the IMG directory 202 among the files stored in the HDD. The thumbnails of the files stored in the TMP directory 203 are not displayed. Furthermore, the thumbnails of the still image data recorded within the TMP directory 203 and file names are not displayed unless a predetermined operation is performed.

Within the IMG directory 202, a still image file (extension "jpg") in a JPEG format in compliance with Exif (Exchangeable Image File Format) is stored. Furthermore, within the IMG directory 202, a movie file (extension "avi") in a Motion-JPEG format, and the like are stored.

In the video camera of the present embodiment, in the movie recording mode, it is possible for the user to perform setting of capturing a still image in a preliminary manner in response to starting/stopping of movie recording being instructed using the shutter button of the operation unit 102. This function will be referred to as a preliminary image-capturing function. It is possible for the user to perform ON/OFF setting of the preliminary recording function before image capturing by using a menu screen or the like displayed on the display unit 109.

When the preliminary image-capturing function is set ON, in the movie recording mode, still image shooting is simultaneously performed when movie recording starts and when movie recording is completed, and still image data is recorded. In the manner described above, the captured still image data is formed such that it is recorded in the TMP directory 203 and the reproduction and display are prohibited unless a predetermined operation is performed in the reproduction mode. The movie data captured at the same time is recorded in the IMG directory 202. This movie data is movie data that is normally displayed in the reproduction mode.

Figure 3:
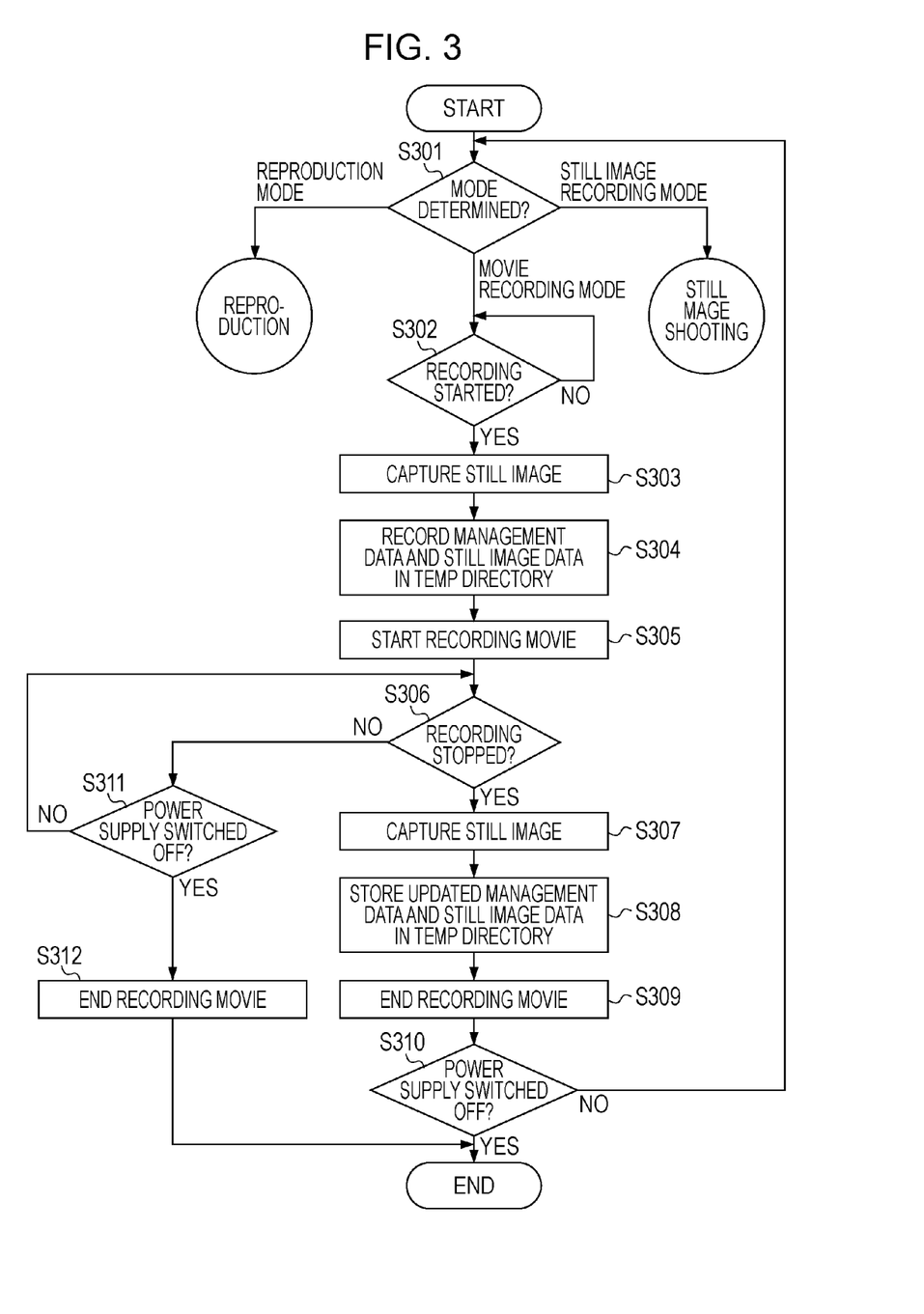
FIG. 3 is a flowchart illustrating the recording operation of the video camera according to the first embodiment of the present invention.

A description will be given below, with reference to the flowchart shown in FIG. 3, of a recording procedure for when the preliminary image-capturing function is set ON.

When the power supply is switched on, the controller 101 makes a determination of the status of the selection switch of the operation unit 102 in order to determine the mode to be one of the reproduction mode, the still image recording mode, and the movie recording mode (S301). Here, the case of the movie recording mode will be described (the movie recording mode in S301).

In the movie recording mode, the controller 101 monitors whether or not the shutter button of the operation unit 102 has been operated (S302). In response to the shutter button of the operation unit 102 being operated, the controller 101 issues an instruction for causing the image-capturing unit 105 and the image processor 106 to capture one still image (S303).

In response to the instruction for capturing a still image being received from the controller 101 in S303, an electrical signal obtained by the image-capturing unit 105 is formed as still image data by the image processor 106 and is written in the HDD 111 by the access unit 112. At this time, the controller 101 generates management data used to associate movie data captured thereafter with the still image data captured this time, and this management data is written in the HDD 111 by the access unit 112. The still image data and the management data are recorded in the TMP directory 203 shown in FIG. 2 (S304). In the reproduction mode, the still image data is not displayed unless a predetermined operation is performed.

When the recording of the still image data is completed, next, the controller 101 issues an instruction for causing the image-capturing unit 105 and the image processor 106 to perform movie recording (S305). The movie recording is continued until the shutter button of the operation unit 102 is operated to instruct the stopping of recording or until the power-supply switch of the operation unit 102 is operated.

When the shutter button of the operation unit 102 is operated to instruct the stopping of the recording (Yes in S306), the controller 101 issues an instruction for causing the image-capturing unit 105 and the image processor 106 to perform still image shooting again (S307).

The electrical signal obtained by the image-capturing unit 105 is formed as still image data by the image processor 106 and is written in the HDD 111 by the access unit 112. At this time, the controller 101 updates the content of the management data that was recorded earlier so that the movie data recorded earlier is associated with the still image data captured this time. The updated management data and the still image data captured this time are recorded within the TMP directory 203 of the HDD 111 (S308).

Next, the controller 101 issues an instruction for causing the image-capturing unit 105 and the image processor 106 to stop the movie recording. The generated movie data is recorded in the IMG directory 202 of the HDD 111 by the access unit 112 (S309). The video camera is in an image-capturing waiting state until the power-supply switch of the operation unit 102 is pressed to switch off the power supply (S310).

In this state, in the IMG directory 202, the movie data that has been captured this time has been recorded, and in the TMP directory 203, the still image data that has been captured when the image-capturing for this time started and was completed has been recorded. Furthermore, in the TMP directory 203, the management data for associating the movie data and the still image data with each other has been recorded.

Next, a description will be given of a case in which the power-supply switch of the operation unit 102 is operated during movie recording in order to instruct the switching off of the power supply (No in S306, Yes in S311).

In response to the power-supply switch of the operation unit 102 being operated, the controller 101 issues an instruction for causing the image-capturing unit 105 and the image processor 106 to complete the movie recording so that the obtained movie data is recorded in the HDD 111 (S312). The movie data is recorded in the IMG directory of the HDD 111.

In this state, in the IMG directory 202, the movie data captured this time has been recorded, and in the TMP directory 203, only the still image data that has been captured when the image capturing for this time started has been recorded. Furthermore, in the TMP directory 203, management data used to associate the movie data and the still image data with each other has also been recorded.

A description has been given of a case in which still image shooting is performed before movie recording starts. However, still image shooting is not limited to this, and still image shooting needs only to be performed in response to the shutter button being operated. Still image shooting may be performed at the same time as movie recording, and still image recording may be performed after movie recording is started. This applies the same for the image-capturing completion time.

Figure 4:
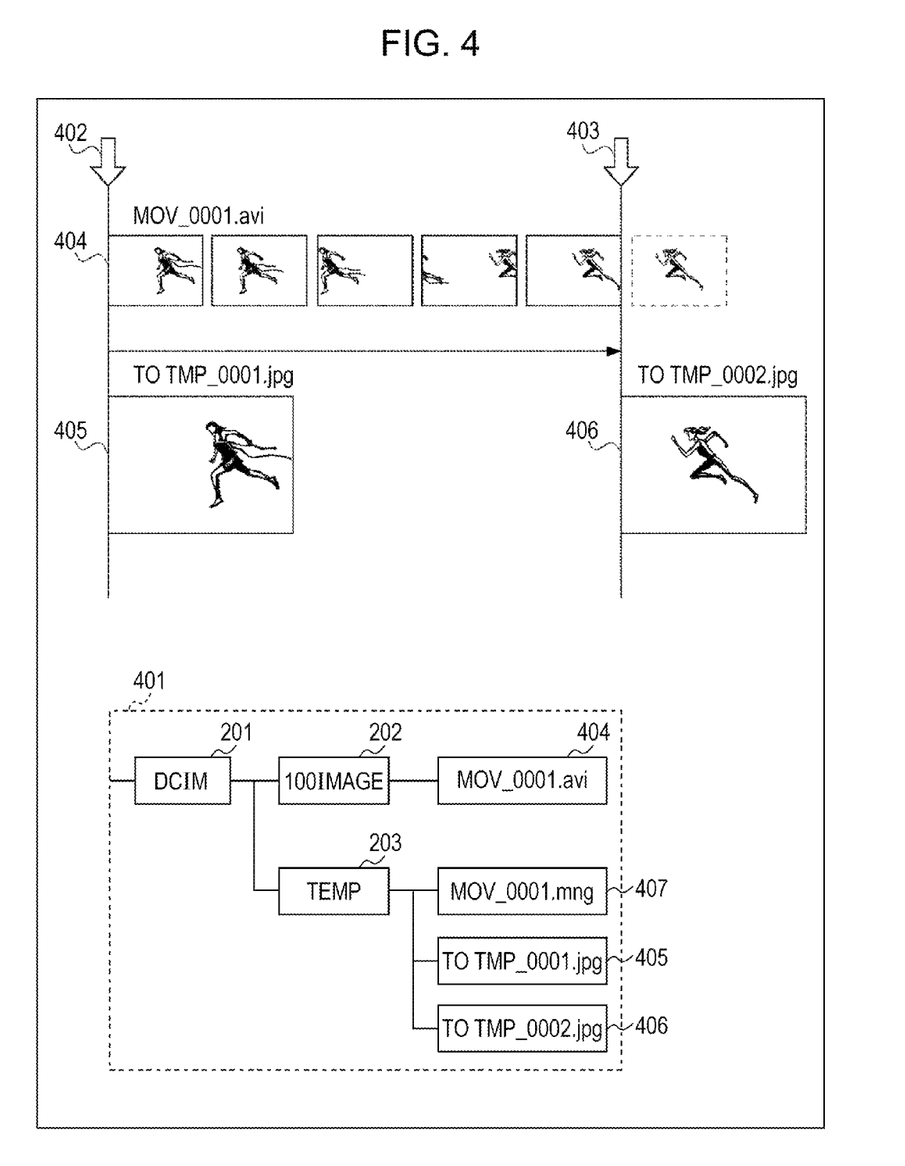
FIG. 4 illustrates image recording in a movie recording mode according to the first embodiment of the present invention.

The state in which the still image data obtained in the manner described above is preliminarily recorded will be described with reference to FIGS. 4 and 5. FIG. 4 illustrates a case in which the shutter button of the operation unit 102 is operated to start movie recording and complete movie recording, and movie data is recorded in the IMG directory 202. At this time, in response to the shutter button of the operation unit 102 being operated, a still image is captured when movie recording starts and when movie recording is completed, and the still image data is recorded in the TMP directory 203. In the TMP directory 203, furthermore, management data used to associate the above-described movie data and the still image data that has been captured when movie recording started and when movie recording was completed is also recorded.

Figure 5:
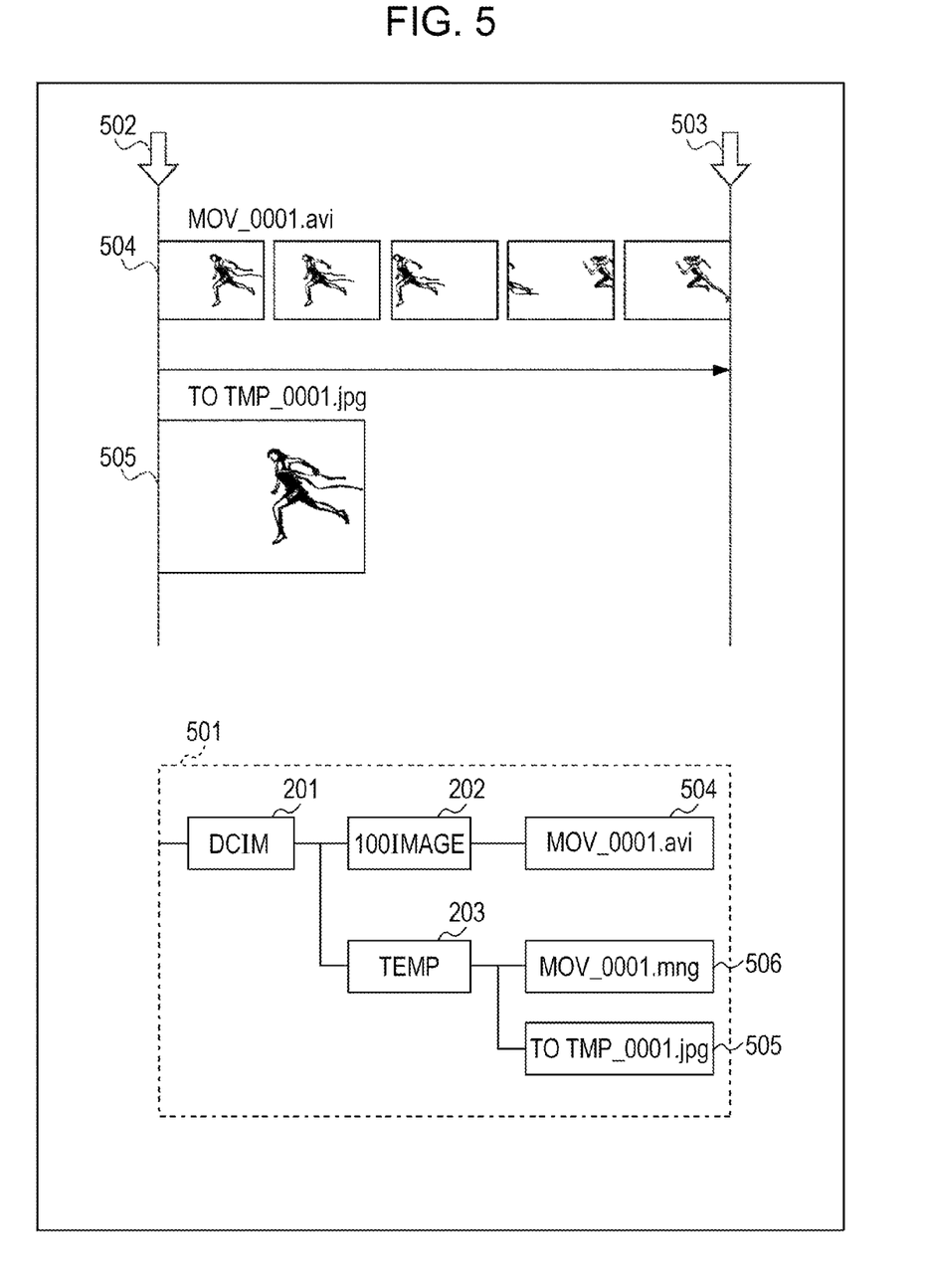
FIG. 5 illustrates image recording in a movie recording mode according to the first embodiment of the present invention.

FIG. 5 illustrates a case in which the shutter button of the operation unit 102 is operated to start movie recording, the power-supply switch of the operation unit 102 is operated to complete movie recording, and movie data is recorded in the IMG directory 202. At this time, in response to the shutter button of the operation unit 102 being operated, a still image is captured when movie recording starts, and the still image data is recorded in the TMP directory 203. In the TMP directory 203, furthermore, management data used to associate the above-described movie data with the still image data that has been captured when movie recording starts and when movie recording is completed is also recorded.

First, the case of FIG. 4 will be described. In FIG. 4, reference numeral 401 denotes the structure of a directory for recording.

First, in response to the shutter button of the operation unit 102 being operated at a timing 402, the capturing of a movie 404 is started and also, the capturing of the still image 405 is performed. The captured still image 405, together with management data 407, is preliminarily recorded within the TMP directory 203.

Next, in response to the shutter button of the operation unit 102 being operated at a timing 403, the capturing of the movie 404 is stopped, and the capturing of the still image 406 is performed. Then, the management data 407 is updated, and the captured still image 406 is recorded within the TMP directory 203. The movie 404 is recorded in the IMG directory 202.

At this point, the management data 407 stored in the TMP directory 203 will be described. As described above, the management data 407 is generated when the movie data 404 is captured and recorded in the TMP directory 203. The management data 407 is data that shows the relationship between the still image 405 captured when the capturing of the movie 404 started, and the movie 404. The management data 407 is also data that shows the relationship between the still image 406 that was captured when the capturing of the movie 404 was completed, and the movie 404. That is, the management data 407 shows the relationship between the movie 404 and the still images 405 and 406. Furthermore, in order that the association between the management data 407 and the movie data 404 can be understood in the file system, a file name the same as that of the movie data is attached.

The case of FIG. 5 will be described. In FIG. 5, reference numeral 501 denotes the structure of a directory for recording.

First, in response to the shutter button of the operation unit 102 being operated at a timing 502, the capturing of the movie 504 is started and also, the capturing of the still image 505 is performed. The captured still image 505, together with management data 506, is preliminarily recorded in the TMP directory 203.

Next, in response to the power-supply switch of the operation unit 102 being operated at a timing 503, the capturing of the movie 504 is stopped. The movie 504 is recorded in the IMG directory 202. That is, when the stopping of movie recording is instructed by an instruction differing from the instruction from the shutter button, the still image is not captured and the processing is completed.

At this point, the management data 506 stored in the TMP directory 203 will be described. As described above, the management data 506 is generated when the movie 504 is captured and recorded in the TMP directory 203. The management data 506 is data that shows the relationship between the still image 505 captured when the capturing of the movie 504 started, and the movie 504. That is, the management data 506 shows the relationship between the movie 504 and the still image 505. Furthermore, in order that the association between the management data and the movie data can be understood in the file system, a file name the same as that of the movie data is attached.

As a result of performing such recording, still images captured when movie recording started and when movie recording was completed in the movie recording mode can be recorded in a form in which the still images are not displayed in the reproduction mode.

Next, a description will be given of a reproduction mode in which the above-described operations are repeated to reproduce and display recorded movie data and still image data.

In the reproduction mode, it is possible for the video camera of the present embodiment to reproduce movie data and still image data, which are usually recorded in the IMG directory 202. Then, in the reproduction mode, when an instruction for performing a deletion process for deleting movie data recorded in the IMG directory 202 is received, it is confirmed whether or not management data exists in the TMP directory 203. When the management data exists, still image data associated with the movie data to be deleted is displayed on the screen so that the user can select whether or not the still image data should be moved to the IMG directory 202. In response to the instruction by the user, the still image data that is moved from the TMP directory 203 to the IMG directory 202 is displayed in the reproduction mode. The thumbnail and the file name of the still image data are also displayed. In the present embodiment, an operation when an instruction for performing a deletion process for deleting movie data is received will be described. In addition, in place of the deletion process, for example, an editing process may be instructed, and the above-described operations may be performed as long as it is an instruction for performing processing on movie data.

A description will be given below, with reference to FIGS. 6 to 9, of an operation for displaying still image data associated with movie data in response to an instruction for performing a deletion process of deleting the movie data in the reproduction mode in the manner described above.

Figure 6:
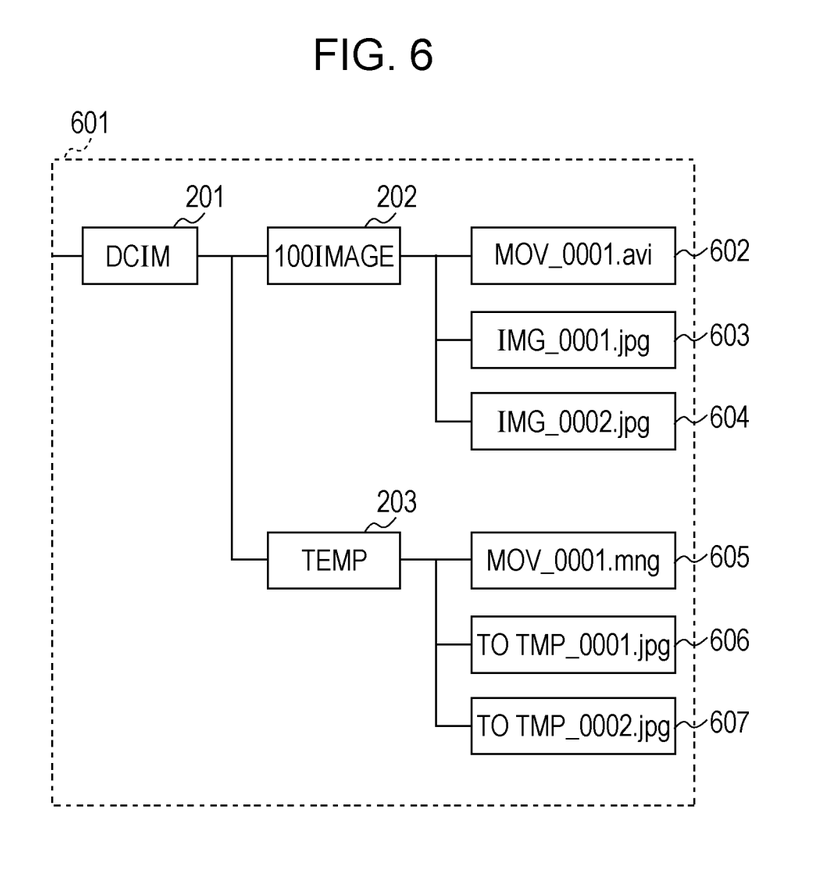
FIG. 6 shows a directory structure before movie data is deleted according to the first embodiment of the present invention.

In FIG. 6, reference numeral 601 denotes the structure of a directory in the HDD 111. In FIG. 6, in the IMG directory 202, a movie 602 captured in the movie recording mode has been recorded. Furthermore, in the IMG directory 202, a still image 603 and a still image 604, which have been captured in the still image recording mode, have been recorded.

In the TMP directory 203, management data 605, a still image 606, and a still image 607 have been stored. The still image 606 is a still image that has been recorded when the shutter button for starting the capturing of the movie 602 is operated in the movie recording mode. The still image 607 is a still image that has been recorded when the shutter button for completing the capturing of the movie 602 is operated. The management data 605 is data used to show the association among the movie 602, the still image 606, and the still image 607.

A description will be given below, with reference to the flowchart in FIG. 7, of an operation when, in the reproduction mode, a user instructs the deletion of the movie 602 among the files recorded in the HDD 111 in the state shown in FIG. 6.

When the user instructs the deletion of the movie 602 by operating the operation unit 102, first, the controller 101 detects whether or not the management data 605 corresponding to the movie 602 exists in the TMP directory (S701).

When the management data 605 does not exist (No in S702), the movie 602 is deleted (S707), and the process returns to, for example, the thumbnail display screen.

When the management data 605 exists (Yes in S702), the still image data associated with the movie 602 by using the management data is displayed on the display unit 109 (S703). On this screen, it is possible for the user to select a still image to be stored in the IMG directory 202 in place of the movie 602 from among the displayed still images. An example of the screen display is shown in FIG. 8.

In FIG. 6, the still image data that is associated with the movie 602 using management data includes the still image 606 and the still image 607. Therefore, FIG. 8 shows a screen via which the still image 606 and the still image 607 are selected on the display unit 109. In FIG. 8, reference numeral 801 denotes a thumbnail indicating the still image 606 captured when movie recording started, and reference numeral 802 denotes a thumbnail indicating a still image 607 when movie recording was completed. Reference numerals 803 and 804 each denote a check box for selecting a still image by the user. The check box 803 indicates a state in which the thumbnail 801 is not specified, and the check box 804 indicates a state in which the thumbnail 802 is specified. Reference numeral 805 denotes an OK button for moving a selected still image (here, the still image 607 corresponding to the thumbnail 802) to the IMG directory 202 so that the still image can be displayed in the reproduction mode. In response to the operation of the OK button 805, the deletion of the movie 605 is performed. Reference numeral 806 denotes a cancel button for canceling the deletion of the movie 605.

Figure 8:
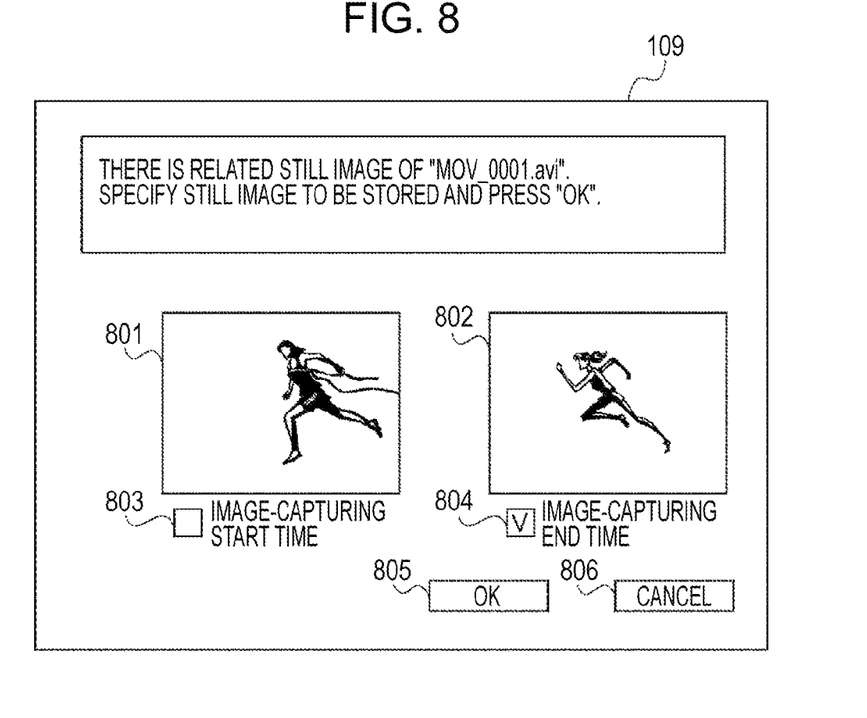
FIG. 8 illustrates the display of a display unit according to the first embodiment of the present invention.

Here, in the display of FIG. 8, when the OK button 805 is operated in a state in which the user has checked the check box 804 (in a state in which the still image 607 has been selected) (Yes in S704), the following operations are performed.

The controller 101 changes the file name of the selected still image 607 and moves it to the IMG directory 202 (S705). As shown in FIG. 6, since the still image 603 and the still image 604 are recorded in the IMG directory 202, in the present embodiment, the file name of the still image is made not to duplicate these. For example, in the present embodiment, a file name that comes last when the file names of the still image files within the IMG directory 202 are viewed sequentially is attached. In the present embodiment, a file name is used such that the numeral portion of the file name of the still image data that has been recorded last in the IMG directory 202 is incremented by one.

At the stage where the changing of the file name of the still image data and the recording thereof are completed, the management data 605 becomes unnecessary, and therefore, this data is deleted (S706). Next, the movie 602 for which a deletion process is instructed is deleted (S707), and the process returns to, for example, the thumbnail display screen again.

In the display of FIG. 8, when the OK button 805 is operated in a state in which both the check boxes 803 and 804 are not checked by the user (in a state in which a still image has not yet been selected) (No in S704), the following operations are performed.

The controller 101 deletes the management data 605 (S706), and deletes the movie 602 for which deletion has been specified (S707). The process then returns to, for example, the thumbnail display screen.

Figure 9:
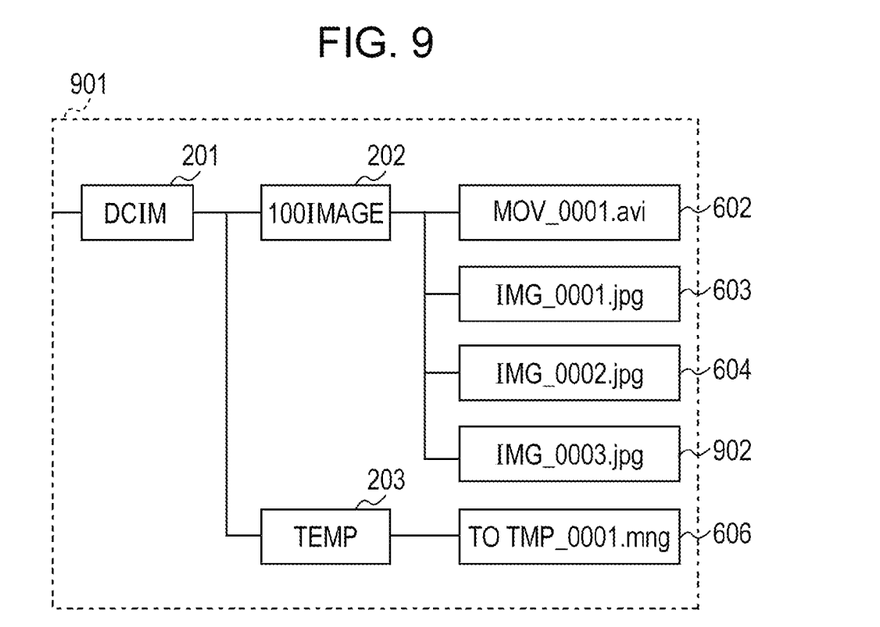
FIG. 9 shows a directory structure after movie data is deleted according to the first embodiment of the present invention.

In accordance with the above-described flow, content data having the directory structure shown in FIG. 6 in the HDD 111 can be formed to be a directory structure shown in FIG. 9.

Reference numeral 901 denotes a directory structure in which the file name of the still image 606 is changed from the directory structure of the directory 601 of FIG. 6 in accordance with the above-described flow, and the still image 606 is moved to the IMG directory 202 from the TMP directory 203.

In FIG. 9, the still image 603 and the still image 604 that have been captured in the still image recording mode have been recorded in the IMG directory 202. Furthermore, in the IMG directory, a still image 902 whose file name has been changed and moved in accordance with the above-described flow has been recorded.

Since the management data 605 has been deleted, only the still image 606 has been stored in the TMP directory 203.

Figure 7:
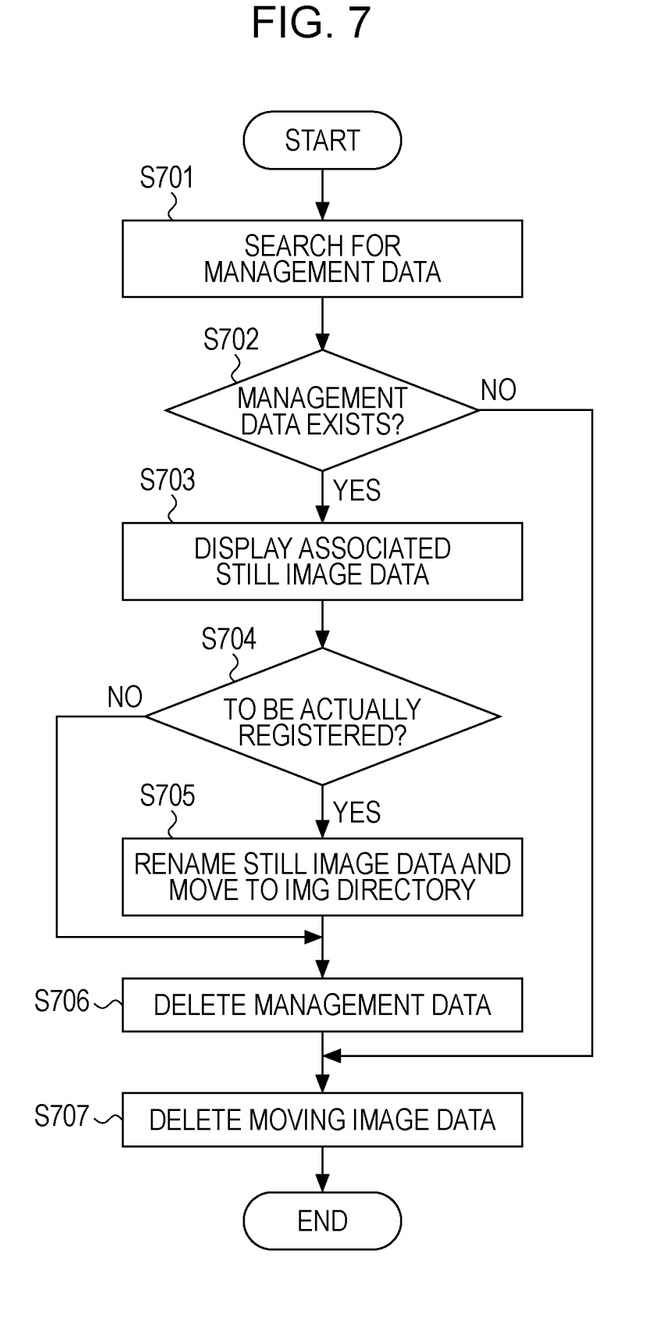
FIG. 7 is a flowchart illustrating an operation performed when movie data is to be deleted according to the first embodiment of the present invention.

By performing processing in accordance with the flow shown in FIG. 7, in the movie recording mode, still image data that has been captured when the recording of movie data started or was completed can be re-recorded so that it can be displayed in the reproduction mode.

In the present embodiment, in the display of FIG. 8, still image data that has not been selected may be maintained recorded in the TMP directory 203, or may be deleted at the same time the movie data is deleted.

Furthermore, in the present embodiment, in order that still image data captured when the recording of movie data starts and is completed in the movie recording mode is not displayed in the reproduction mode, still image data is recorded in the TMP directory 203. However, a method in which still image data is not displayed in the reproduction mode is not limited to this. For example, control may be performed so that still image data that is recorded in the IMG directory 202 and recorded as a still image file in compliance with Exif is not displayed unless a predetermined operation is performed. In this case, code indicating that the still image file, together with still image data, is not displayed as long as a predetermined operation is not performed in the reproduction mode is written to a maker note portion in the still image file in compliance with Exif. In addition to this, the still image data may be recorded as an attribute for handling as a hidden file in the computer. In this case, the controller 101 of the video camera may perform control so that a hidden file is not displayed as long as a predetermined operation is not performed in the reproduction mode. In order to record a still image in this manner, it is necessary for the controller 101 to identify whether the recording mode when a still image is to be recorded is set in a still image recording mode or is set in a movie recording mode. It is then determined whether or not data for causing a still image not to be displayed in the reproduction mode should be written to the still image recorded in the selected recording mode. The access unit 112 writes these items of data, together with the still image data, to the HDD 111.

In the present embodiment, still image data within the TMP directory 203, which is associated with management data, is displayed on the display unit 109 when a deletion process for deleting movie data is instructed. However, in the normal reproduction mode, in a case where it is confirmed whether or not management data corresponding to movie data exists and the management data exists, display indicating that a still image associated with movie data exists may be performed.

In a case where, when movie data is selected, it is confirmed whether or not management data corresponding to the movie data exists, and the management data exists, the fact that the still image associated with the movie data exists may be displayed. Furthermore, information indicating a corresponding still image may be reduced in size and displayed.

In a case where, when movie data is to be reproduced, it is confirmed whether or not management data corresponding to the movie data exists, and the management data exists, the still image associated with the movie data may be displayed before and after the movie data is reproduced. Alternatively, all the associated still images may be displayed before reproduction, or all the associated still images may be displayed after reproduction. Alternatively, before reproduction, a still image recorded when movie recording started may be displayed and also, after reproduction, a still image recorded when movie recording was completed may be displayed. That is, in a case where a process for reproducing movie data is instructed, the management data may be confirmed, and still image data associated with the movie data may be displayed.

In a case where, when movie recording is completed, it is confirmed whether or not management data corresponding to the movie data exists, and the management data exists, the still image associated with the movie data may be displayed. That is, when a process for completing the recording of the movie data is instructed, the management data may be confirmed, and the still image data associated with the movie data may be displayed.

In the present embodiment, still image data in the TMP directory 203, which is associated using the management data, is displayed on the display unit 109 when an instruction for deleting movie data is made. However, display may be performed in such a manner that an instruction for displaying still image data within the TMP directory 203 is specified separately using a menu or the like. Furthermore, in a state in which the still image data of the TMP directory 203 is displayed, the controller 101 may move, in accordance with an instruction from the user, the recording folder of the still image data so that the still image data is displayed in the reproduction mode.

In the present embodiment, the storage capacity of the HDD 111 is consumed by image data within the IMG directory 202 and by image data and management data within the TMP directory 203. In the video camera of the present embodiment, the storage area used by the data within the TMP directory 203 may be reported as an available capacity to the user. When the storage remaining capacity of the HDD 111 falls below a predetermined amount, the files within the TMP directory 203 may be overwritten with movie data to be stored next in ascending order of the recording date and time. Furthermore, when the storage remaining capacity of the HDD 111 falls below a predetermined ratio, the files within the TMP directory 203 may be overwritten with movie data to be stored next in ascending order of the recording date and time. However, the newly recorded movie data and the like are recorded in the IMG directory 202 rather than in the TMP directory 203.

Although the files within the TMP directory are overwritten with movie data to be recorded next in ascending order of the recording date and time, the order may not be an ascending order.

For example, still image data having two still images, which is associated with management data, may be overwritten with a higher priority, so that still image data having one still image, which is indicated by the management data, may be left as much as possible. The reason for this is that, in a case where the user captures a still image and a movie by mistake, the operation is often completed by operating the power-supply switch without pressing the shutter button once more. In this case, in the video camera of the present embodiment, only the still image data recorded at the same time as when the movie recording started is recorded, and the still image data recorded at the same time as when the movie recording was completed is not recorded. Therefore, still image data having one still image, which is associated with management data, is left as much as possible.

In the present embodiment, when movie data is to be deleted, whether or not still image data associated with the movie data can be displayed in the reproduction mode is selected by the user, but this may not be selected. For example, when movie data is to be deleted, automatically associated still image data may be displayed in the reproduction mode. The switching of the functions can be implemented by performing setting on a menu screen or the like in advance.

In the present embodiment, a video camera having a movie recording mode and a still image shooting mode have been described. In addition, the present invention can be applied to a video camera having a movie recording button and a still image shooting button. In this case, by pressing the movie recording button, starting of image capturing or completion of image capturing is instructed. Therefore, still image shooting needs only to be performed at respective timings, and still image data obtained at that time needs only to be recorded in the TMP directory 203.

Other Embodiments

In the present embodiment, a video camera has been described as an image pickup apparatus capable of capturing and recording a movie and a still image. The present invention can be applied to other apparatuses as long as they have a function of capturing movie data and still image data.

The present invention may also be implemented by supplying a storage medium storing program code of software that implements the functions of the above-described embodiments to a system or an apparatus. In this case, a computer (or a CPU or an MPU) of the system or the apparatus reads out and executes the program code stored on the storage medium.

In this case, the program code itself read out from the storage medium implements the functions of the above-described embodiments, and the program code itself and the storage medium storing the program code constitute the present invention.

Types of the storage medium used for supplying the program code include, for example, a flexible disk, a hard disk, an optical disc, a magneto-optical disc, a CD-ROM, a CD-R, a magnetic tape, a nonvolatile memory card, and a ROM.

In addition, an operating system (OS) or the like running on the computer executes part of or the entirety of processing according to the instruction of the program code in order to implement the functions of the above-described embodiments.

Alternatively, after the program code read out from the storage medium is written in a memory that is provided in a function expansion board included in the computer or in a function expansion unit connected to the computer, the CPU or the like in the function expansion board or in the function expansion unit executes part of or the entirety of the processing on the basis of instructions in the program code in order to implement the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-289258 filed Nov. 7, 2007, which is hereby incorporated by reference herein in its entirety.

What is claimed is:

1. An image processing apparatus comprising:
   a first generator that generates movie data;
   a second generator that generates still image data;
   a recorder that records the movie data and the still image data on a recording medium;
   a controller, in response to an instruction to start recording the movie data, controls the first generator to generate the movie data, controls the second generator to generate the still image data and controls the recorder to record the generated movie data and the generated still image data on the recording medium in such a manner as to be associated with each other; and
   a display unit;
   wherein the controller controls, in response to an instruction to delete or edit the movie data recorded on the recording medium, the display unit to display information of the still image data on a display apparatus, wherein the still image data, the information of which is displayed, is recorded in response to the instruction to start recording of the movie data to be deleted or edited, and
   wherein the controller controls the recorder to delete the still image data to be deleted from the recording medium when the movie data associated with the still image data is deleted.

2. The image processing apparatus according to claim 1, wherein the controller controls, in response to the instruction to delete or edit the movie data recorded on the recording medium, the display unit to display images for selecting still image data not to be deleted from among the still image data associated with the movie data to be deleted or edited on the display apparatus.

3. The image processing apparatus according to claim 1, further comprising:
   an imaging unit that outputs image data,
   wherein the first generator generates the movie data using the image data output from the imaging unit, and the second generator generates the still image data using the image data of a picture corresponding to the instruction to start recording the movie data.

4. The image processing apparatus according to claim 1, wherein the recorder manages each of the movie data and the still image data as a file and manages a movie file including the movie data and a still image file including the still image data by storing the movie file and the still image file in a directory, and wherein the controller controls the recorder such that the movie file is stored in a predetermined directory and the still image file including the still image data associated with the movie data is stored in a directory other than the predetermined directory.

5. A method performed in an image processing apparatus which includes a first generator, a second generator, a recorder, a controller, and a display unit, the method comprising:

via the first generator, generating movie data;
via the second generator, generating still image data;
via the recorder, recording the movie data and the still image data on a recording medium; and
via the controller, in response to an instruction to start recording the movie data, controlling the first generator to generate the movie data, controlling the second generator to generate the still image data and controlling the recorder to record the generated movie data and the generated still image data on the recording medium in such a manner as to be associated with each other, wherein the controller controls, in response to an instruction to delete or edit the movie data recorded on the recording medium, the display unit to display information of the still image data on a display apparatus, wherein the still image data, the information of which is displayed, is recorded in response to the instruction to start recording of the movie data to be deleted or edited, and wherein the controller controls the recorder to delete the still image data to be deleted from the recording medium when the movie data associated with the still image data is deleted.

6. An image processing apparatus comprising:
a first generator that generates movie data;
a second generator that generates still image data;
a recorder that records the movie data and the still image data on a recording medium;
a controller that controls the recorder to record the movie data generated by the first generator and a plurality of still image data generated by the second generator on the recording medium in such a manner as to be associated with each other; and
a display unit;

wherein the controller controls, in response to an instruction to edit the movie data recorded on the recording medium, the display unit to display information of the plurality of still image data associated with the movie image data and images for selecting still image data not to be deleted from among the plurality of still image data associated with the movie data to be edited on a display apparatus, and wherein the controller controls the recorder to delete still image data to be deleted from the recording medium when the movie data associated with the still image data to be deleted is deleted.

7. The image processing apparatus according to claim 6, further comprising:
an imaging unit that outputs image data,
wherein the first generator generates the movie data using the image data output from the imaging unit, and the second generator generates the plurality of still image data using the image data output from the imaging unit.

8. The image processing apparatus according to claim 7, wherein the controller controls the second generator to generate the plurality of still image data using the image data of a picture corresponding to an instruction to start recording a moving image and the image data of a picture corresponding to an instruction to stop recording a moving image.

9. The image processing apparatus according to claim 6, wherein the recorder manages each of the movie data and the still image data as a file and manages a movie file including the movie data and a still image file including the still image data by storing the movie file and the still image file in a directory, and wherein the controller controls the recorder such that the movie file is stored in a predetermined directory and the still image file including the still image data associated with the movie data is stored in a directory other than the predetermined directory.

10. An image processing method performed in an image processing apparatus which includes a first generator, a second generator, a recorder, a controller, and a display unit, the method comprising:

via the first generator, generating movie data;
via the second generator, generating still image data;
via the recorder, recording the movie data and the still image data on a recording medium; and
via the controller, recording the movie data generated and a plurality of still image data generated on the recording medium in such a manner as to be associated with each other, wherein the controller controls, in response to an instruction to edit the movie data recorded on the recording medium, a display unit to display information of the plurality of still image data associated with the movie image data and images for selecting still image data not to be deleted from among the plurality of still image data associated with the movie data to be edited on a display apparatus, and wherein the controller controls the recorder to delete the still image data to be deleted from the recording medium when the movie data associated with the still image data to be deleted is deleted.

11. The image processing method according to claim 10, further comprising:
outputting image data using an imaging unit,
wherein the movie data is generated using the image data output from the imaging unit, and the plurality of still image data is generated using the image data output from the imaging unit.

12. The image processing method according to claim 11, wherein the plurality of still image data are generated using the image data of a picture corresponding to an instruction to start recording a moving image and the image data of a picture corresponding to an instruction to stop recording a moving image.

13. The image processing method according to claim 10, wherein each of the movie data and the still image data are managed as a file and a movie file including the movie data and a still image file including the still image data are managed by storing the movie file and the still image file in a directory, and wherein the movie file is stored in a predetermined directory and the still image file including the still image data associated with the movie data is stored in a directory other than the predetermined directory.

* * * * *